Figure 1:
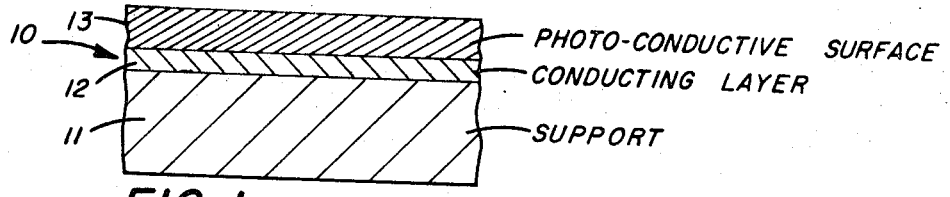
Figure 2:
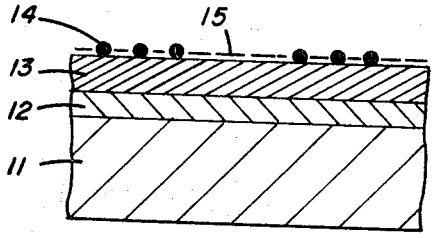
Figure 3:
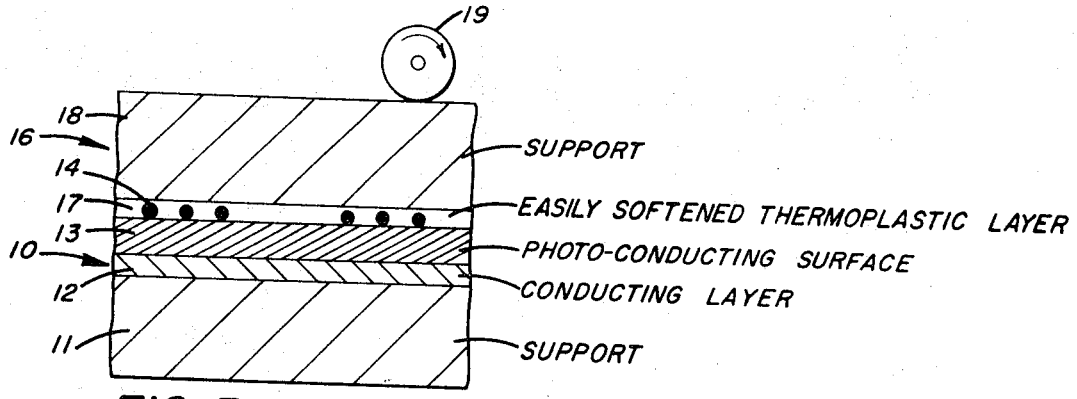
Figure 4:
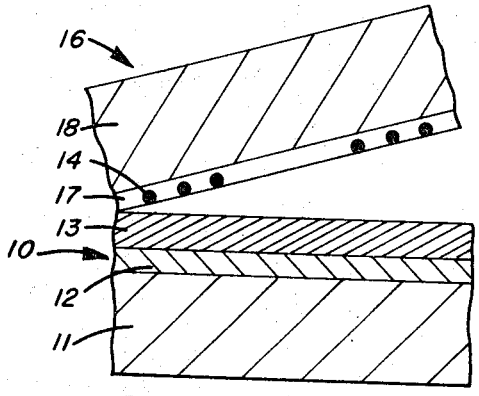

DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED OCTOBER 13, 1970

879 O.G. 367

T879,009

METHOD OF TRANSFERRING AN ELECTROSTATICALLY FORMED IMAGE

William J. Staudenmayer and William Trachtenberg, both of 1669 Lake Ave., Rochester, N.Y. 14615

Filed Apr. 23, 1970, Ser. No. 31,231
Int. Cl. G03g *13/16*
U.S. Cl. 96—1.4
1 Sheet Drawing. 14 Pages Specification

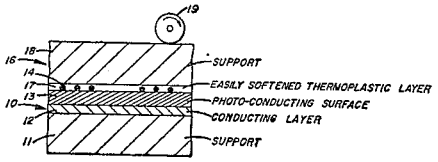

A receiving sheet with a softened surface is pressed against an organic photoconductor bearing a liquid-developed xerographic image which image retains a portion of the liquid developing solvent therein. The image transfers to the receiver during the application of heat and pressure. The receivers are capable of providing microimages with resolution of several hundred line pairs per millimeter. No additional fixation is required.

Oct. 13, 1970 W. J. STAUDENMAYER ET AL T879,009

METHOD OF TRANSFERRING AN ELECTROSTATICALLY FORMED IMAGE

Filed April 23, 1970

WILLIAM J. STAUDENMAYER
WILLIAM TRACHTENBERG
INVENTORS

BY Tom Hiatt

ATTORNEY